April 28, 1953 W. B. KING 2,636,296
WATER GAP GATE
Filed June 24, 1949 2 SHEETS—SHEET 1
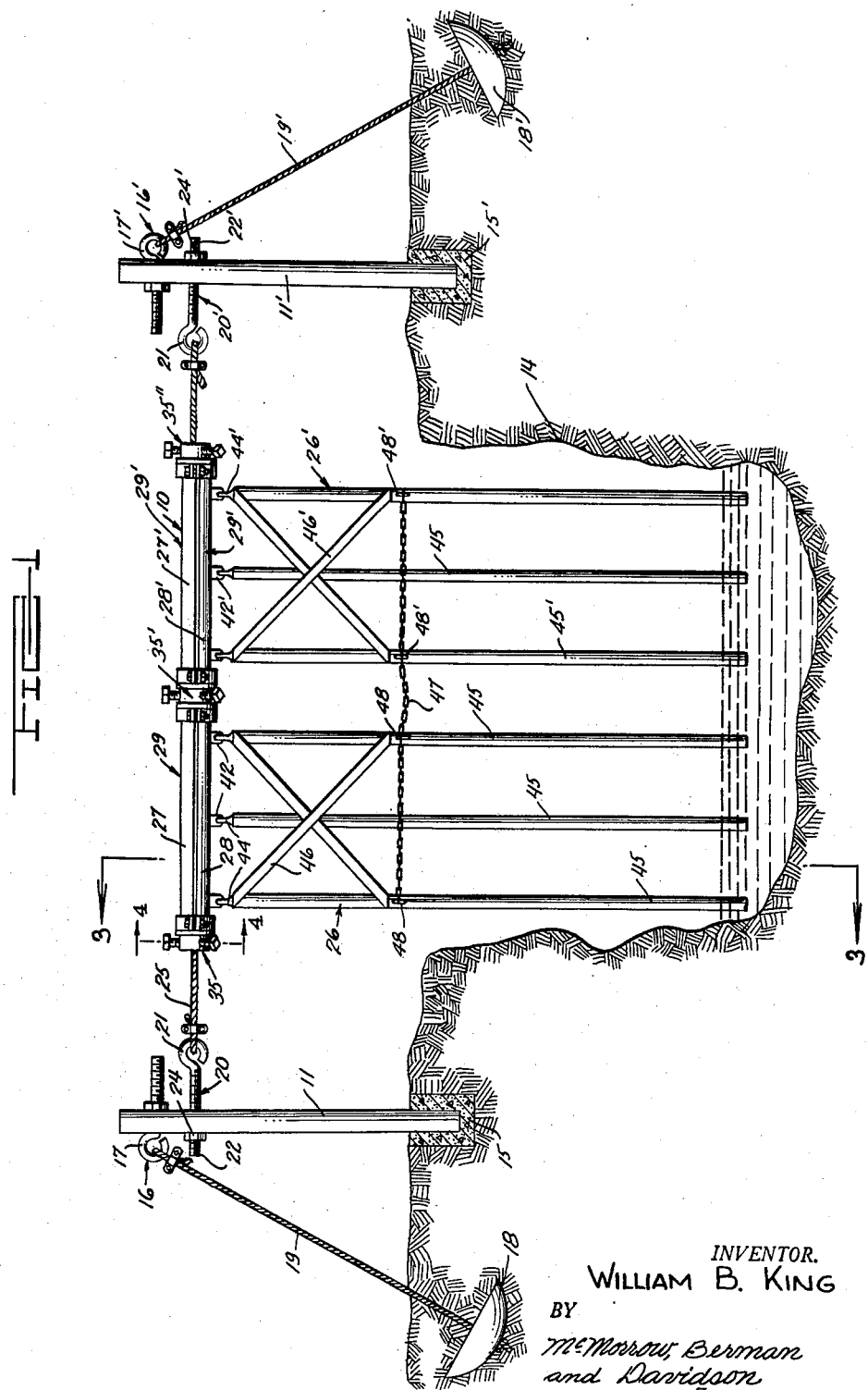
INVENTOR.
WILLIAM B. KING
BY
McMorrow, Berman
and Davidson
ATTORNEYS

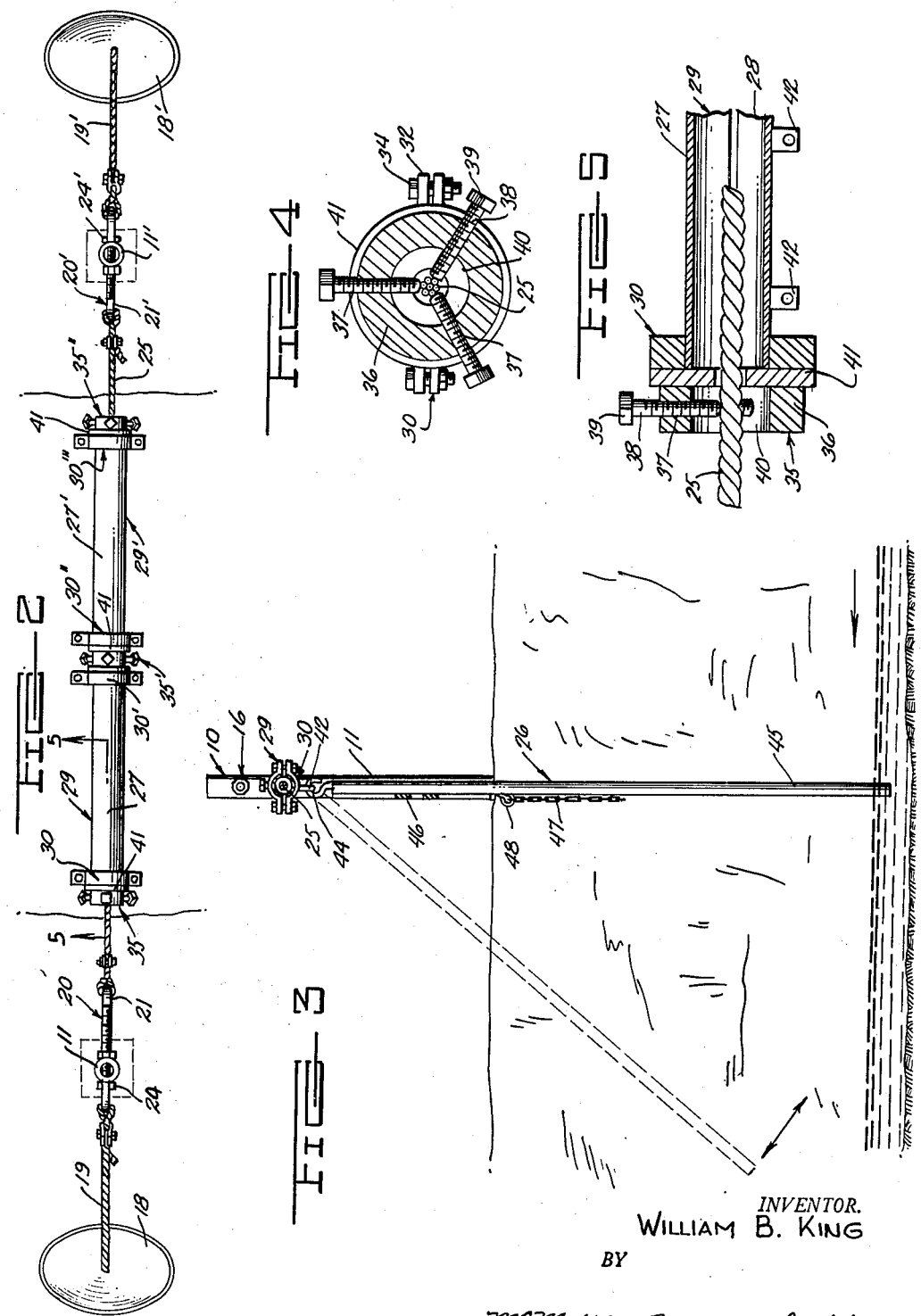

Patented Apr. 28, 1953

2,636,296

UNITED STATES PATENT OFFICE 2,636,296

WATER GAP GATE

William B. King, Yuma, Colo.

Application June 24, 1949, Serial No. 101,167

5 Claims. (Cl. 39—4)

1

This invention relates to a gate for a water gap, and more particularly to a swingable gate for restraining cattle within the bounds of a selected area while providing for the free flow of a stream or water course therethrough.

It is an object of this invention to provide a vertically-swinging water-gap gate of the kind to be more particularly described hereinafter formed in sections which may be coupled together on a common suspension cable or supporting member to provide a gate of any selected or desirable width.

Another object of this invention is to provide a water-gap gate of this kind having separated or spaced-apart gate-forming vertical rods or posts extending into the water and secured together at their upper ends for permitting the free flow of water and floating debris between the gate bars in the normal and flood stages of the water.

Still another object of this invention is to provide a sectional water-gap gate of this kind which is preferably made of metal to suitably endure the wear of time and water, and is adjustably suspended above the water to provide for the engagement of the bars within the water above the bottom of the water course.

With the above and other objects in view, my invention consists in the arrangement, combination and details of construction disclosed in the drawings and specification, and then more particularly pointed out in the appended claims.

In the drawings:

Figure 1 is a front elevation of a water-gap gate constructed according to an embodiment of my invention;

Figure 2 is a top plan view thereof;

Figure 3 is a transverse section taken on the line 3—3 of Figure 1;

Figure 4 is a transverse section on an enlarged scale taken on the line 4—4 of Figure 1;

Figure 5 is a fragmentary longitudinal section on an enlarged scale taken on the line 5—5 of Figure 2.

Referring to the drawings, the numeral 10 designates generally a water-gap gate constructed according to an embodiment of my invention, for restraining cattle or other livestock within a selected area having a water course therein while providing for the free flow of the water at the various stages of the water level, as under normal conditions and at flood stages. The gate 10 will provide for the unobstructed flow of the water through the water gap or course and is formed for the free passage of logs and other forms of debris through the gate, the gate restraining the passage or free movement of the livestock through the gate when the gate is being moved to provide for the free passage of large obstructions floating in the water.

The water-gap gate 10 is formed of a pair of spaced-apart posts or supporting members 11, 11', fixed on the opposite sides of the water course 14. The posts or supporting members 11, 11', are formed of metal pipes, tubing or other rigid supporting members which are embedded, at their lower ends, in concrete 15, 15', and extend vertically upwardly above the surface of the surrounding earth. Eye bolts 16, 16', are extended transversely through the extreme upper ends of the posts 11, 11', and have the eyes 17, 17', respectively, on the outer sides thereof. Disc-shaped concave anchor plates 18, 18' are submerged in the ground adjacent the supporting posts 11, 11', and are secured to the eyes 17, 17', by suitable cables 19, 19'. The ground anchors 18, 18', together with the cables 19, 19', will suitably support the posts 11, 11', against displacement from their anchors 15, 15', during the movement of the gate members to be described hereinafter. The cables 19, 19', are extended downwardly and outwardly from the extreme upper ends of the posts 11, 11', forming braces for holding the posts 11, 11', against swinging inwardly at their upper ends, as effected by the weight of the gate supported therebetween.

Second eye bolts 20, 20', have eyes 21, 21', and threaded shanks 22, 22', are engaged through the upper ends of the posts 11, 11', immediately below the eye bolts 16, 16'. The eyes 21, 21', of the eye bolts 20, 20', are positioned on the inner sides of the supporting posts 11, 11', and the threaded shanks 22, 22', are extended outwardly for the engagement of suitable nuts 24, 24', on the outer ends thereof. The nuts 24, 24', threadably engaging the threaded shanks 22, 22', provide for the selected transverse adjustment of the eye bolts 20, 20'. A cable or suspension member 25 is engaged at its opposite ends in the inwardly extending confronting eyes 21, 21', of the eye bolts 20, 20', as clearly shown in Figure 1 of the drawings.

A plurality of gate sections 26, 26', are swingably supported along the length of the horizontal suspension member 25 and depend therefrom into the water course 14.

The gate sections 26, 26', are formed with a pair of horizontal semi-cylindrical split sleeve sections 27, 28, 27' and 28' respectively, forming horizontal sleeves or bearings 29, 29', circumposed on the supporting member 25. The split sleeve sections 27, 28, of the sleeve 29 are formed at one end with complemental half clamping members 30, and at the other end with complemental half clamping members 30', while the split sleeve sections 27', 28' of the sleeve 29' are formed at one end with complemental half clamping members 30'' and at the other end with complemental half clamping members 30'''. Since the clamping members 30, 30', 30'' and 30''' are of the same specific structure, only one will be specifically described. The complemental clamping members 30 are each formed of a semi-circular member 31 fixed to the one end of the sleeve sections 27 and 28 by welding or other suitable fastening means, and each of the clamping elements 31 is formed with an outwardly-extending apertured flange 32 at the opposite ends thereof. A suitable bolt 34 is adapted to be engaged between the overlying flanges 32 of the cooperating clamping elements 31 for fixedly securing the sleeve sections 27 and 28 together.

A clamping collar 35 is fixed on the suspension member 25 adjacent the complemental clamping member 30, a clamping collar 35' is fixed on the suspension member 25 between the complemental clamping members 30' and 30'', and a clamping collar 35'' is fixed on the suspension member 25 adjacent the complemental clamping members 30''', the respective collars securing the gate sections 26, 26' against sliding movement on the suspension member 25. Since the structure of and the manner of securement of the collars 35, 35', and 35'' to the suspension member 25 is identical, the description of the collar 35 is deemed sufficient. The clamping collar 35 is formed of an annular body 36 having circumferentially-spaced-apart, radially-extending threaded recesses 37 extending therethrough and a set screw 38 threadably engaged in each of the apertures 37. A rectangular head 39 is formed on the outer ends of each of the set screws 38 to provide for the suitable engagement of a tool for threading the set screws through the body 36 for engagement with suspension member 25 within the circular opening 40 within the body 36. A washer 41 is circumposed about the suspension cable 25 between the clamping collar 35 and the complemental clamping members 30 for spacing the latter members from the collar 35.

The sleeve section 28 of the sleeve 29 has a plurality of longitudinally spaced apart hinge eyes 42 along the length thereof, and the sleeve section 28' of the sleeve 29' has a plurality of longitudinally spaced apart hinge eyes 42' along the length thereof. A gate bar 45 is swingably connected to each of the hinge eyes 42 of the sleeve section 28 of the sleeve 29 by means of a hook 44 on the upper end of the bar, while a gate bar 45' is swingably connected to each of the hinge eyes 42' of the sleeve section 28' of the sleeve 29' by means of a hook 44' on the upper end of the bar 45'. The upper end portions of the bars 45 of the gate section 26 are secured together by means of transverse connecting bars or members 46, and the upper end portions of the bars 45' of the gate section 26' are likewise secured together by means of transverse connecting bars or members 46', the bars 46 and 46' being fixed respectively to the depending bars 45 and 45' by welding or other suitable rigid attaching means. The plurality of bars 45, 45', of each of the gate sections 26 swing as a unit from the respective sleeve 29. The lower ends of the gate bars or rods 45, 45', depend from the suspension member 25 a suitable distance for engaging in the water of the water course at the extreme low level of the water and the connecting bars 46, 46', are positioned above the normal flood or high-water level of the water course, whereby floating debris in the water may freely pass through the vertical bars 45 and will not be obstructed by any transverse connecting members in any normal stage of the water level, whereas the connecting bars 46, 46', at the upper ends of the depending bars 45, 45', will provide an obstruction for the livestock to prevent the passage of the livestock through the water gate 10.

A flexible connecting member 47, which may be in the form of a chain, a cable or other suitable flexible member, is connected between the bars 45 and 45' of the gate sections 26, 26', to provide for the limited free swinging movement of each of the gate sections while also providing for the unitary movement of the sections together after a limited free swinging movement of any one of the gate sections. Specifically, the flexible member 47 has one end secured to a hook 48 formed on the outer one of the bars 45 of the section 26, the member 47 extending across and through a like hook 48 formed on the inner one of the bars 45 of the section 26, through a like hook 48' formed on the inner one of the bars 45' of the section 26', and thence through a like hook 48' formed on the outer one of the bars 45' of the section 26' with the other end secured to the hook 48' on the outer one of the bars 45' of the section 26'.

The thin depending gate bars 45, 45', provide for the free passage of the water and debris as they are free and separated at their lower ends from the adjacent gate bar and they will not cause the eddying of the water to form sand banks on the down-stream side of the gate, which normally results in damage or breaking of the gate at the time of the following flood.

By forming the gate 10 of sections 26, 26', a suitable gate may be provided for a water course 14 of any width, as the separate gate sections 26, 26', will provide for the same desirable result irrespective of the number of gate sections 26, 26', which are connected together in the manner described above.

I do not mean to confine myself to the exact details of construction herein disclosed, but claim all variations falling within the purview of the appended claims.

I claim:

1. In a water-gap gate having a suspension member for spanning a water course and a plurality of gate sections depending from said suspension member, each of said gate sections comprising a pair of semi-cylindrical sleeve sections circumposed about and clampingly secured together about said suspension member and rotatable thereon, hinge eyes on one of said sleeve sections, a gate bar swingably depending from each of said eyes and depending at its lower end into said water course, and means clampingly engaged on said suspension member and engaging the adjacent end of each of said sleeve sections for positioning said gate sections on said suspension member.

2. In a water-gap gate having a suspension member for spanning a water course and a plurality of gate sections depending from said suspension member, each of said gate sections comprising a pair of semi-cylindrical sleeve sections circumposed about and clampingly secured together about said suspension member and rotatable thereon, hinge eyes in one of said sleeve sections, a gate bar swingably depending from each of said eyes and depending at its lower end into said water course, and clamping collars engaged on said suspension member and engaging the adjacent end of each of said sleeve sections for positioning said gate sections on said suspension member.

3. In a water-gap gate having a suspension member for spanning a water course and a plurality of gate sections depending from said suspension member, each of said gate sections comprising a pair of semi-cylindrical sleeve sections circumposed about and clampingly secured together about said suspension member and rotatable thereon, hinge eyes on one of said sleeve sections, a gate bar swingably depending from each of said eyes and depending at its lower end into said water course, means clampingly engaged on said suspension member and engaging the adjacent end of each of said sleeve sections for positioning said gate section on said suspension member, and a horizontal flexible member secured between adjacent gate sections forming a loose connection therebetween providing for the limited free swinging of each of said gate sections.

4. In a water-gap gate having a suspension member for spanning a water course and a plurality of gate sections depending from said suspension member, each of said gate sections comprising a pair of semi-cylindrical sleeve sections, interengaging split clamp elements fixed on said sleeve sections clampingly securing said sleeve sections together, hinge eyes in one of said sleeve sections, a gate bar swingably depending from each of said eyes and depending at its lower end into said water course, and clamping collars engaged on said suspension member and engaging the opposite ends of said sleeve sections for positioning said gate sections on said suspension member.

5. In a water-gap gate having a suspension member for spanning a water course and a plurality of gate sections depending from said suspension member, each of said gate sections comprising a sleeve circumposed about and clampingly secured about said suspension member and rotatable thereon, a plurality of hinge eyes depending from each of said sleeves, a gate bar swingably depending from each of said eyes and depending at its lower end into said water course, and means clampingly engaged on said suspension member and engaging the adjacent end of each of said sleeves for positioning said gate sections on said suspension member.

WILLIAM B. KING.

References Cited in the file of this patent

UNITED STATES PATENTS

| Number | Name | Date |
|---|---|---|
| 161,757 | Covert | Apr. 6, 1875 |
| 186,435 | Parsons | Jan. 23, 1877 |
| 244,543 | Burke | July 19, 1881 |
| 528,821 | Story | Nov. 6, 1894 |
| 910,717 | Olson | Jan. 26, 1909 |
| 2,018,580 | Schonhoff et al. | Oct. 22, 1935 |